United States Patent [19]
Sperling

[11] Patent Number: 5,837,967
[45] Date of Patent: Nov. 17, 1998

[54] BURNER HOLDER FOR MECHANIZED OR AUTOMATED ARC WELDING OR CUTTING TORCHES, ESPECIALLY MACHINE AND/OR ROBOT TORCHES

[75] Inventor: Hermann Sperling, Gau-Bischhofsheim, Germany

[73] Assignee: Alexander Binzel GmbH & Co. KG, Germany

[21] Appl. No.: 617,746

[22] PCT Filed: Sep. 14, 1994

[86] PCT No.: PCT/EP94/03090

§ 371 Date: Jul. 19, 1996

§ 102(e) Date: Jul. 19, 1996

[87] PCT Pub. No.: WO95/07790

PCT Pub. Date: Mar. 23, 1996

[30] Foreign Application Priority Data

Sep. 14, 1993 [DE] Germany .......................... 43 31 095.8

[51] Int. Cl.[6] ...................................................... B23K 9/00
[52] U.S. Cl. .......................................... 219/125.1; 901/42
[58] Field of Search ........................... 219/125.1, 124.33, 219/125.11, 136, 137.2, 138, 139; 901/42

[56] References Cited

U.S. PATENT DOCUMENTS 4,986,002  1/1991  Oros et al. .

FOREIGN PATENT DOCUMENTS

| 2516831 | 5/1983 | France . | |
|---|---|---|---|
| 203839 | 11/1983 | German Dem. Rep. | 219/138 |
| 208580 | 4/1984 | Germany . | |
| 3545503 | 6/1987 | Germany . | |
| 3704939 | 8/1988 | Germany . | |
| 9206138 | 2/1992 | Germany . | |

*Primary Examiner*—Clifford C. Shaw
*Attorney, Agent, or Firm*—Price, Heneveld, Cooper, Dewitt & Litton

[57] ABSTRACT

The specification relates to a burner holder for a mechanized or automated welding or cutting device, e.g. machine or robot burner (2). In order to be able easily, reliably and especially reproducibly to insert the burner at a predetermined point, the burner (2) is releasably held between two clamping jaws (3, 4) which grip the burner (2) at least in areas of the periphery and at least one of which can be moved between an open and a closed position.

16 Claims, 4 Drawing Sheets

BURNER HOLDER FOR MECHANIZED OR AUTOMATED ARC WELDING OR CUTTING TORCHES, ESPECIALLY MACHINE AND/OR ROBOT TORCHES

FIELD OF THE INVENTION

Background of the Invention

The invention pertains to a torch holder for mechanized or automated arc welding or cutting torches, e.g. machine and/or robot torches.

During mechanized welding with a so-called Machine Torch, the torch is not operated by a welder, but is fixed in a device where the relative movement between torch and work piece occurs mechanically. To achieve this, either the work piece is static and the torch moves or, conversely, the torch can be fixed, while the work piece moves.

Already some torches have been known to be affixed to a robot arm. A special holder serves to fasten the torch on the machine, that is to say on the sliding block of the cutting device, or on the robot arm, to which the torch either is clamped or strapped. The disadvantage in such an attachment is on the one hand, that the attachment has to be done by hand, which results in an imprecise torch alignment, or at least in one that is difficult to achieve. On the other hand, after replacing disposable parts, to reestablish the exact former position with the familiar fastening devices is only possible with significant time expenditure.

SUMMARY OF THE INVENTION

Consequently, it is the object of this invention to create a holder of the previously mentioned variety in such a way as to achieve a simple and safe insertion of the torch at a set position, that can be reproduced.

The invention solves this task by deciding that the torch should be held by at least two clamping jaws, which encircle the torch at least partially and at least one of which can be moved between an open and closed position.

According to the invention, the torch holder achieves a defined attachment of the torch on the appropriate apparatus. An exchange of a torch or of worn parts is possible without long change-over time, especially with the mechanical opening and closing of the clamping jaws, so that the downtime of the welding or cutting devices is significantly reduced. The torch can be fastened in such a way, that all clamping jaws are moveable in the closed position or e.g. one clamping jaw is fixed permanently while the other(s) move(s) in the closed position.

A special, initial model of the invention intends for the two clamping jaws to be movable between the open and closed position, synchronized to one another sidewise along a guide on the holder, which again improves the performance during the assembly and disassembly of the torch and the setup precision. Furthermore, the mobility of the clamping jaws, in a parallel gripping manner, permits the attachment of torches with different measurements.

An exceptionally firm hold of the torch to the welding or cutting device is attained, when, according to the invention, the clamping jaws are shaped in a sort of gripper arms.

For instance, a subsequent development of the invention concept arranges to activate the clamping jaws with a pneumatic piston-cylinder assembly, where the piston rod acts upon, preferably, two movable sliding parts, perpendicular to the direction of the clamping jaw motion, which are within the holder guide and have link guidance, which is gripped by the pertinent link part attached to the corresponding clamping jaw. Such a parallel gripper with link guidance distinguishes itself by its simple construction and robustness in rough welding operations. Of course it is also conceivable to use only one instead of two sliding parts, which contains the two link guidances. But the use of two sliding parts achieves higher alignment precision.

According to the invention, the link guidance can consist of elongated slots running in an angle of 45° to the direction of movement of the sliding part(s), into which the corresponding link piece, preferably with roller bearings, intermeshes. The friction resistance during opening and closing of the clamping jaws is significantly reduced by this mechanism.

According to the invention, the piston-cylinder assembly can be constructed as a double action cylinder, where the fluid admission for closing the clamping jaws occurs from the direction of the cover and for opening from the piston rod side of the piston-cylinder assembly. This assures in an advantageous way from a standpoint of safety technology, that the force originating from the piston-cylinder assembly for closing the clamping jaws is in each case larger than the opening force.

In again another model of the invention, the clamping jaws contain fasteners which react with counter fasteners on the torch for automatic centering or aligning of the torch during the closing of the clamping jaws. This attains extremely high alignment and duplication precision for the location of the torch in the holder after a torch exchange or an exchange of a worn part on the torch, which in turn has an immediate impact on the quality of the weld connection.

For ease of construction, the fastening devices should be formed as locking mechanisms, preferably as spring loaded bolts, pegs, spherical elements or the like with protruding projections opposite the clamping jaws, which fit into at least one indentation on the outer circumference of the torch.

According to the invention, the holder is also supposed to have receptacle for inserting a fastening element that is attached to the torch. This accomplishes a pre-alignment of the torch and/or the holder. Simultaneously, the operating element serves as insertion guide during the mounting of the torch on the holder. Moreover, the insertion of a possible locking connection of the torch's operating element into the holder receptacle prevents the torch from accidentally falling out of the holder during a release of the clamping jaws. Furthermore, the coupling mechanism stops the torch from being inserted backwards into the holder. Because of the fasteners and their counterparts on the clamping jaws and the torch, it is only necessary to place the torch with its coupling part onto the opening of the holder, whereupon the fasteners and their counterparts secure the alignment and the positioning of the torch independently, when the clamping jaws are being closed, regardless of the torch's position. Of course, it is also possible for the torch to be fixed into the holder exclusively with its fastening element.

According to a suggestion of the invention, the insertion and locking of the torch into the holder is especially simplified, if the end of the operating element or of the bolt, that is inserted into the receptacle of the holder, has a nipple shaped extension and the receptacle on the holder has a corresponding indentation.

According to the invention, there is also a safety mechanism with a switch element, which, in the coupling position, activates an operating element in the receptacle of the torch and in that switch position activates the switch element for closing the clamping jaws.

In a preferred method, the switch element is designed either to close a control circuit for the power supply of the torch during the coupling position of the operating element in the receptacle or to interrupt it. When the torch is not mounted or in position, the power supply of the torch is turned off.

The clamping jaw of the torch, which is within the control circuit extending from the holder, is designed to contain an interlock circuit with contacts situated on the torch, which, in coupling position, activate matching contacts on the coupling part of the receptacle of the torch and in closing position on the clamping jaws of the holder. This ensures that the power supply is interrupted when the torch is removed. For instance, even with a push-pull torch, no welding wire can be inserted when the torch is removed. This assures completely, that there is no danger of injury for the operator, when the torch is removed. The circuitry of such an interlock circuit can be accomplished by looping the circuit for the control current of the torch through the electronics of the holder.

Finally, the power supply for the holder or its operating parts, like the solenoid valves of the piston-cylinder assembly, occurs via the torch through the wiring harness. Consequently, only the attachment of the holder on the guiding machine or the robot arm is required, there is no need for a power supply of the holder or for its clamping jaws through a circuit coming from the robot or from the guiding machine. Thus an autarchic system is created without having to make special alterations on the robot or the welding machine.

According to the invention, the holder excels, furthermore, through its compact design and low weight and, because of its special construction, it offers the option of adding an exhaust assembly or an elevation adjustment mechanism between itself and the guiding machine or the robot arm.

Other aims, advantages, characteristics, and application possibilities of the present invention arise from the subsequent description of a design model with the aid of the drawings. All described and/or depicted characteristics represent, by themselves or in any sensible combination, the objective of the present invention, independent from their summary in the claims or their relationship.

DESCRIPTION OF THE PREFERRED EMBODIMENTS

The torch holder consists of a main body 23 with an assembly flange 24 for attachment to the arm of a welding or cutting robot or to the guide mechanism of a welding or cutting machine.

Figure 1:
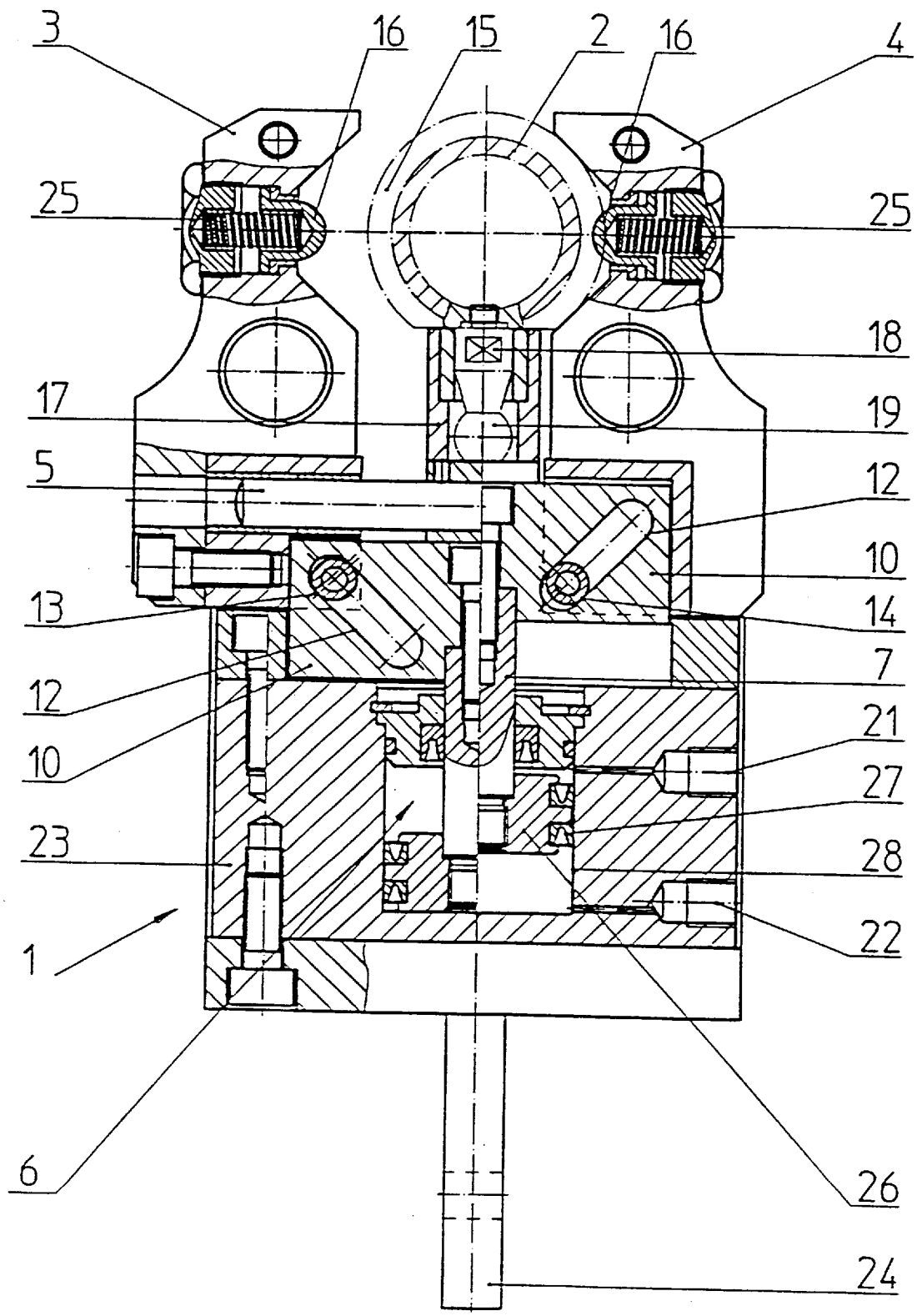
FIG. 1 is according to the invention, the cross section of a possible construction model of a torch holder.

Located on the end of the holder 1 opposite the assembly flange 24, there are two clamping jaws 3, 4, which can be slid sideways along a guide 5 between an open and a closed position. FIG. 1 shows the clamping jaw 3 in an open position, while the clamping jaw 4 is in a closed position. In closed position, the torch, identified with 2, is encircled around its circumference by the clamping jaws 3, 4, which are shaped like gripper arms. On the inner side of the clamping jaws 3, 4, there is a locking element 16 protruding to the inside, which enters into an indentation 15 on the circumference of the torch 2 during the closing of the clamping jaws 3, 4. This accomplishes the automatic centering and alignment of the torch 2 in the predetermined position on the holder. The locking elements 16 are shaped as half spherical elements and are kept in position by springs 25.

The operation of the clamping jaws 3, 4 proceeds through a piston-cylinder assembly 6 located in the main body 23 of the holder 1; the piston rod 7 of which acts upon a moveable sliding part 9 within a guide of the main body 23, which glides perpendicular to the sliding movement of the clamping jaws 3, 4. On that sliding part 9, there are elongated slots 11, 12, arranged in an angle of about 45° in reference to their direction of movement, which are linked with an arm or a plate (not shown) to the corresponding clamping jaw 3, 4.

These parallel grippers with link guidance operate in such a way, that, starting with the clamping jaws 3, 4 in open position, equivalent to the position of the clamping jaw 3 in FIG. 1, a supply line 22 admits pressure fluid into the piston-cylinder assembly 6 from its cover direction or from the direction of the piston 26. This causes the piston 26 with its ring seals 27 to glide along the cylinder wall 28 formed within the main body 23 in the direction of the clamping jaws 3, 4. Simultaneously, the slide 9 is also pushed in the direction of the clamping jaws 3, 4 by the piston rod 7, while the roller bearing link pieces 13, 14 within the elongated slots 11, 12 of the slide 9 execute a relative motion, so that the clamping jaws 3, 4 are pushed towards each other in synchronized movement from an open to a closed position, while encircling the torch 2. Moving the clamping jaws 3,4 from a closed to an open position occurs by admission of pressure fluid through the supply line 21, so that the piston 26, the piston rod 7, and the slide 9 are retracted, which causes the clamping jaws 3, 4 to move to the outside to their open position.

Figure 2:
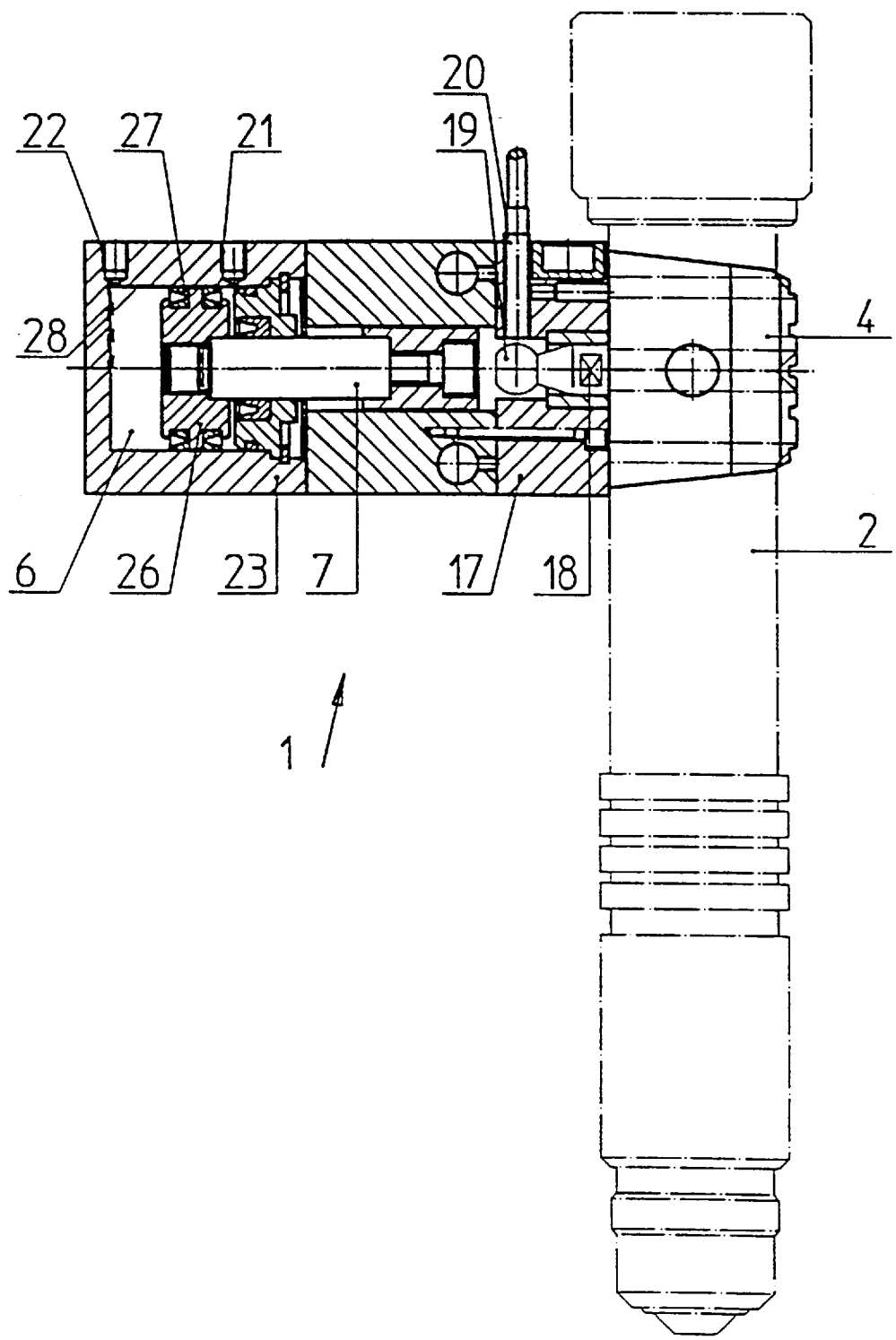
FIG. 2 is a side view of the torch holder of FIG. 1, partial cutaway.
Figure 3:
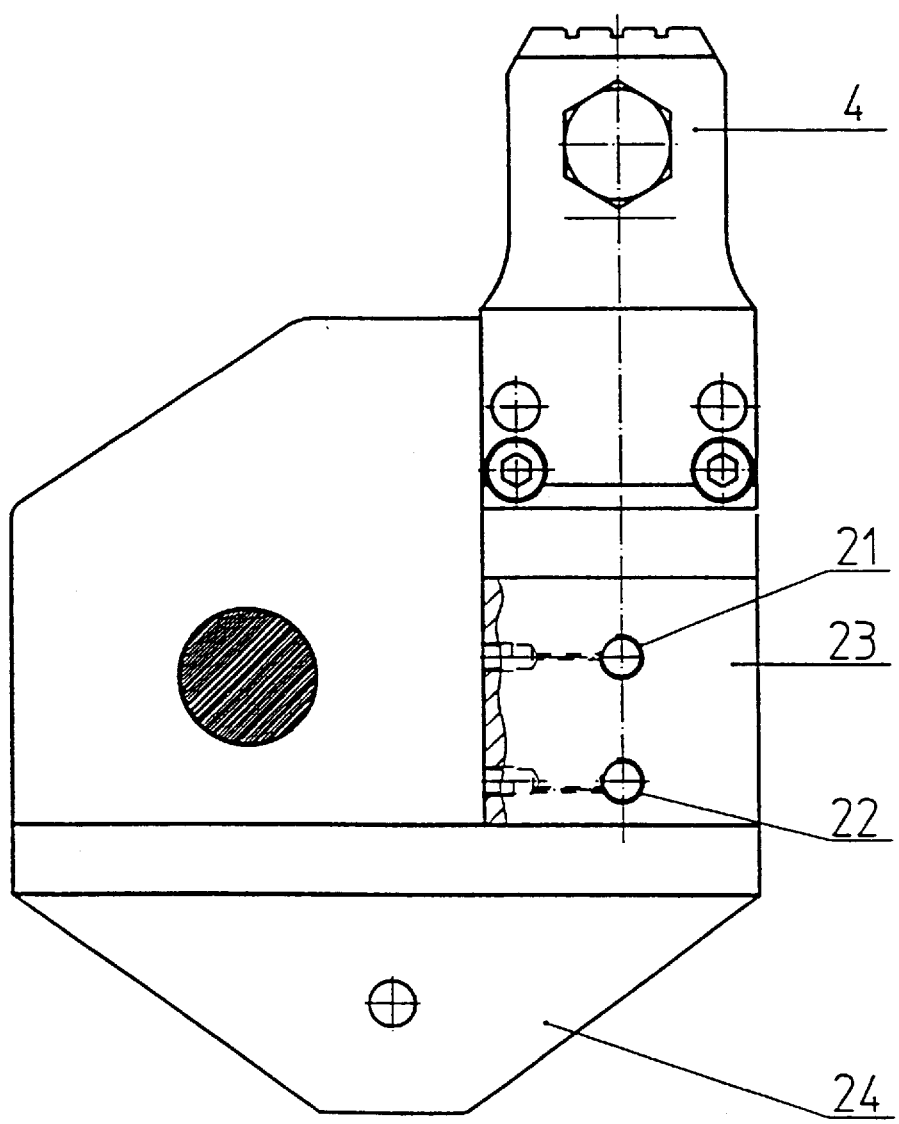
FIG. 3 is another side view of the torch holder of FIG. 1 and 2.

As shown in FIGS. 1 and 2, there is a receptacle 17 between the clamping jaws 3, 4, into which a coupling piece 18, connected to the torch 2, can be inserted and locked. For this purpose, the inserted end of the coupling piece 18 is formed like a nipple shaped extension 19, while the receptacle 17 has an indentation conforming to the nipple shaped extension 19 for inserting and locking the coupling piece 18. This achieves a pre-alignment of the torch 2 to the holder 1, before the clamping jaws 3, 4 are brought into the closed position. At the same time, the coupling piece 18 with its nipple shaped extension 19 serves as insertion guide during the mounting of the torch 2 on the holder 1. It also prevents the torch 2 from accidentally falling out of the holder 1 during the opening of the clamping jaws 3, 4.

As can be seen further in FIG. 2, the coupling piece 18 or its nipple shaped extension 19 activate a switch element 20, which is linked to a safety mechanism. This safety mechanism ensures that the power supply to the torch 2 and thus the closing of the clamping jaws 3, 4 is not possible until the switch element 20 is activated. The switch element can be e.g. a mechanical, optical, or electrical switch element, for instance an inductive proximity switch. An interlock circuit (also not shown) is designed for the circuitry of the power supply of the torch 2 with contacts located on the torch 2; those contacts, in coupling position on the coupling piece 18 and in closing position on the clamping jaws 3, 4, activate matching contacts on the holder 1. The circuit is not closed, and so the power supply for the torch 2 is not activated, until the contacts and the matching contacts connect. This ensures, that there is no danger of injury for the operator, when the torch 2 is removed. The circuitry of the control circuit can be accomplished by looping the circuit for the control current of the torch 2 through the electronics of the holder 1.

Furthermore, the power supply for the holder 1 takes place through the wiring harness (not shown) of the torch 2. Therefore, no special devices or alterations on the robot or on the welding or cutting machine are required.

Figure 4:
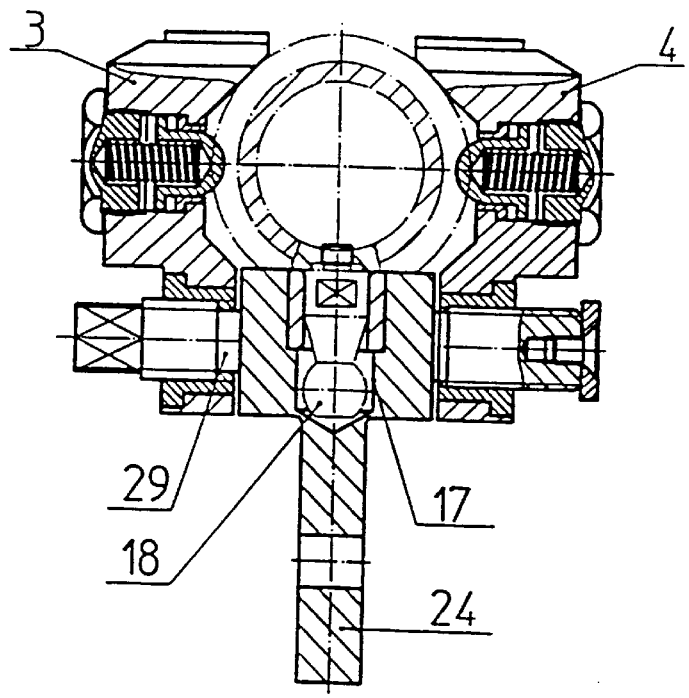
FIG. 4 is according to the invention, another construction model of a torch holder for manual operation.

Of course, it is also possible use a mechanical instead of a pneumatic, hydraulic, or electrical motor to operate the clamping jaws 3, 4. As can be seen especially in FIG. 4, a spindle 29, passing through the clamping jaws 3, 4, with a right hand thread on one side and a left hand thread on the other is designed for that purpose. The spindle 19 is located on the holder 1 in the area of the receptacle 17 for the operating element 18. By applying a tool, e.g. wrench, on the face of the spindle 19, the clamping jaws 3, 4 can be moved to the open or closed position.

Figure 5:
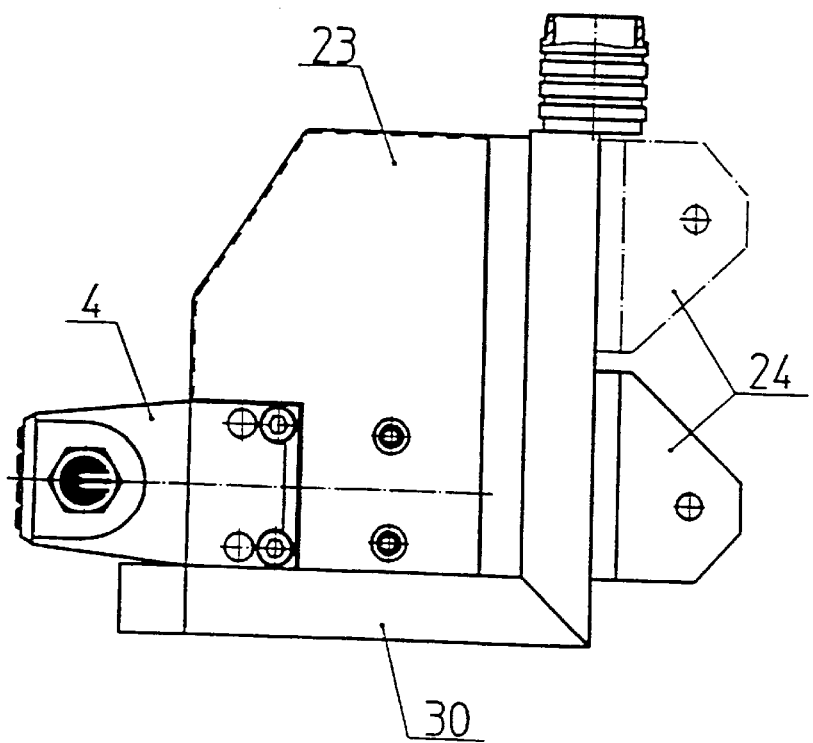
FIG. 5 is a torch holder like in FIG. 1 with an exhaust assembly.

As can be seen from FIG. 5, the specific shape of the holder 1 offers the option of adding add-on pieces like an exhaust assembly 30 or a elevation adjustment mechanism 5 in sandwich construction between the main body 23 of the holder 1 and the assembly flange 24. The sandwich construction achieves a particularly compact model. There is also the option to select a particular add-on part as the need arises or possibly include several add-on parts one after the other in modular system between the main body 23 and the assembly flange 24.

What is claimed is:

1. A system consisting of a burner and a burner holder for a mechanized, automated welding or cutting device, wherein the burner is retained to be releasable between at least two clamping jaws which encompass the burner circumferentially, and wherein the clamping jaws are laterally displaceable in a direction relative to each other along a guide between an opened and a closed position, characterized in that the lateral displacement of the clamping jaws is effected by a pneumatic piston and cylinder arrangement in which the piston acts on a sliding member which is displaceable in a direction perpendicular to the direction of displacement of the clamping jaws, the sliding member defining first and second elongated slots extending along an angle oblique to the direction of displacement of the sliding member, each of the elongated slots being associated with one of the clamping jaws, the sliding member being operably connected to the clamping jaws by first and second linkage arms, each linkage arm including a roller bearing engaging an associated one of the elongated slots and being linked to an associated one of the clamping jaws, whereby movement of the piston causes movement of the sliding member, which effects movement of the clamping jaws.

2. The system of claim 1, wherein the clamping jaws are constructed in the form of gripper arms.

3. The system of claim 1, wherein the piston and cylinder arrangement is constructed to be double-acting, wherein charging with fluid to effect closing of the clamping jaws occurs at one end of the cylinder and charging of fluid to effect opening of the clamping jaws occurs at an opposite end of the cylinder.

4. The system according to claim 1, wherein the clamping jaws include retaining means which cooperate with counter retainer means on the burner for automatic centering and adjustment of the burner during closing of the clamping jaws.

5. The system according to claim 1, wherein the retaining means includes spring-loaded detents which protrude from the clamping jaws and engage at least one depression on the outer circumference of the burner.

6. The system according to claim 1, wherein the holder comprises a receptacle for receiving a fastening element mounted on the burner.

7. The system according to claim 6, wherein the fastening element is a bolt.

8. The system according to claim 6, wherein an end of the bolt receivable in the receptacle of the holder comprises a nipple-shaped extension.

9. The system according to claim 6, wherein the fastening element is retained in the receptacle by means of a detent connection.

10. The system according to claim 6, further comprising safety equipment including a switching element which is actuated when the bolt is disposed within the receptacle to permit closing of the clamping jaws.

11. The system according to claim 10, wherein the switching element interrupts the electrical current supply for the burner.

12. The system according to claim 6, wherein an electrical current supply for the burner is conducted through the burner holder and comprises an interlock circuit including electrical contacts on the burner and electrical contacts on the burner holder which are electrically engaged with the contacts on the burner when the bolt is disposed in the receptacle, whereby power supply for the burner is not activatable until the electrical contacts on the burner electrically engage the electrical contacts on the burner holder.

13. The system according to claim 1, wherein an electrical power supply for the burner holder is conducted through the burner.

14. The system according to claim 1, wherein the holder comprises a body to which attachment parts can be fixed.

15. The system according to claim 14, wherein the attachment parts may be screw fastened between a mounting flange and the body of the burner holder.

16. The system according to claim 1, wherein the burner is an arc-cutting burner or an arc-welding burner.

* * * * *